US008732228B2

(12) United States Patent
Edwards et al.

(10) Patent No.: US 8,732,228 B2
(45) Date of Patent: May 20, 2014

(54) PUBLISHING DOCUMENTS IN A PUBLISH/SUBSCRIBE DATA PROCESSING SYSTEM

(75) Inventors: Andrew Stephen Marcus Edwards, Southampton (GB); Andrew Ian Hickson, West Wellow (GB); Martin Robert Holder, Southampton (GB); Trevor Lobban, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 1537 days.

(21) Appl. No.: 11/282,047

(22) Filed: Nov. 17, 2005

(65) Prior Publication Data

US 2006/0106810 A1     May 18, 2006

(30) Foreign Application Priority Data

Nov. 18, 2004   (GB) .................................. 0425355.5

(51) Int. Cl.
*G06F 15/16*     (2006.01)
(52) U.S. Cl.
USPC ............................ 709/201; 715/239; 715/751
(58) Field of Classification Search
USPC ....................................................... 709/201
See application file for complete search history.

(56) References Cited

U.S. PATENT DOCUMENTS

| | | | | |
|---|---|---|---|---|
| 5,768,528 A | * | 6/1998 | Stumm ........................ | 709/231 |
| 5,949,876 A | * | 9/1999 | Ginter et al. .................... | 705/80 |
| 6,044,372 A | | 3/2000 | Rothfus et al. | |
| 6,088,717 A | * | 7/2000 | Reed et al. .................... | 709/201 |
| 6,421,570 B1 | * | 7/2002 | McLaughlin et al. ............ | 700/2 |
| 6,502,102 B1 | * | 12/2002 | Haswell et al. ............... | 707/102 |
| 6,523,027 B1 | * | 2/2003 | Underwood ...................... | 707/4 |
| 6,609,128 B1 | * | 8/2003 | Underwood .................... | 707/10 |
| 6,633,878 B1 | * | 10/2003 | Underwood .................. | 707/100 |
| 6,658,568 B1 | * | 12/2003 | Ginter et al. ................... | 713/193 |
| 6,701,514 B1 | * | 3/2004 | Haswell et al. ............... | 717/115 |
| 6,757,710 B2 | * | 6/2004 | Reed .............................. | 709/203 |
| 7,035,910 B1 | * | 4/2006 | Dutta et al. .................... | 709/217 |
| 7,085,755 B2 | * | 8/2006 | Bluhm et al. ...................... | 707/3 |
| 7,249,317 B1 | * | 7/2007 | Nakagawa et al. ........... | 715/209 |
| 7,257,767 B1 | * | 8/2007 | Carden, Jr. ..................... | 715/234 |

(Continued)

FOREIGN PATENT DOCUMENTS

WO        03/043286 A     5/2003

OTHER PUBLICATIONS

"Publish/Subscribe User's Guide" IBM Publication, [Online] Jun. 2002, pp. 1-232 URL:http://www-306.ibm.com/software/integration/mqfamily/library/books/amqnar09.pdf.

(Continued)

*Primary Examiner* — Hamza Algibhah
(74) *Attorney, Agent, or Firm* — Steven L. Nichols; Van Cott, Bagley, Cornwall & McCarthy P.C.

(57)     ABSTRACT

Documents are published in a publish subscribe data processing system. A first document to be published may have an associated topic. The first document is retained as a retained document. A second document to be published is retained as the retained document in response to receiving the second document before a predetermined time interval has passed. A copy of the second document is sent to a subscriber of the topic. A copy of the retained document is sent to the subscriber of the topic in response to a determination that the predetermined time interval has passed.

10 Claims, 5 Drawing Sheets

(56) References Cited

U.S. PATENT DOCUMENTS

| | | | |
|---|---|---|---|
| 7,266,826 B2* | 9/2007 | Katiyar et al. | 719/316 |
| 7,287,066 B2* | 10/2007 | Ruggaber et al. | 709/220 |
| 7,302,634 B2* | 11/2007 | Lucovsky et al. | 715/200 |
| 2001/0020250 A1* | 9/2001 | Campbell et al. | 709/224 |
| 2001/0034763 A1* | 10/2001 | Jacobs et al. | 709/204 |
| 2002/0059265 A1* | 5/2002 | Valorose, III | 707/100 |
| 2002/0059426 A1* | 5/2002 | Brinkerhoff et al. | 709/226 |
| 2002/0152257 A1* | 10/2002 | Frolik et al. | 709/201 |
| 2003/0091016 A1* | 5/2003 | Ko et al. | 370/338 |
| 2004/0064510 A1* | 4/2004 | Ooi et al. | 709/205 |
| 2004/0073483 A1* | 4/2004 | Cohen et al. | 705/14 |
| 2004/0083274 A1* | 4/2004 | Katiyar et al. | 709/217 |
| 2004/0085354 A1* | 5/2004 | Massand | 345/751 |
| 2004/0179687 A1* | 9/2004 | Lai et al. | 380/247 |
| 2004/0205572 A1* | 10/2004 | Fields et al. | 715/513 |
| 2004/0250283 A1* | 12/2004 | Duigenan et al. | 725/60 |
| 2005/0096928 A1* | 5/2005 | Ruggaber et al. | 705/1 |
| 2005/0262439 A1* | 11/2005 | Cameron | 715/523 |
| 2006/0041538 A1* | 2/2006 | King et al. | 707/3 |
| 2006/0085507 A1* | 4/2006 | Zhao et al. | 709/206 |
| 2006/0126621 A1* | 6/2006 | Bedi et al. | 370/389 |
| 2007/0282795 A1* | 12/2007 | Mashinsky | 707/3 |

OTHER PUBLICATIONS

"MQSeries Integrator—Timer Plug-In Version 1.0" IBM Publication, [Online] Sep. 3, 2001, pp. 1-24 URL:http://www-306.ibm.com/software/integration/support/supportpacs/individual/supportpacs/ia0k.pdf.

European Search Report Apr. 13, 2006.

"IBM MQSeries: Publish/Subscribe User's Guide," V1,R0.7, ;10th ed, Jun. 2002; http://www-306.ibm.com/software/integration/mqfamily/library/books/amqnar09.pdf (p. 3, line9-34; p. 4,line7-21; fig. 1; p. 5,line13-20; p. 22,line37-46; p. 23, line1-3; p. 46,line7-10).

"MQSeries Integrator-Timer Plug-In V1.0," 1st ed, Sep. 2001, http://www-306-ibm.com/software/integration/ support/supportpacs/individual/supportpacs/ia0k.pdf (abstract, p. 1-3).

\* cited by examiner

PUBLISHING DOCUMENTS IN A PUBLISH/SUBSCRIBE DATA PROCESSING SYSTEM

BACKGROUND OF THE INVENTION

The present invention relates to publishing documents in a publish/subscribe data processing system, and in particular, it relates to publishing a document after a defined time interval.

Computer systems and software applications can interact through a model of communication known as publish/subscribe. In a publish/subscribe system, information is published as documents by a broker. The broker can be a software application or a broker computer system. Each published document is categorized into a topic. The topic for a document can reflect the content or context of the document. Subscribers, such as subscriber software applications or subscriber computer systems, can create subscriptions with the broker to receive a copy of documents published to a particular, subscribed, topic. Once a subscriber has a subscription for a topic, a copy of all documents published for that topic are sent to the subscriber.

FIG. 1 is a block diagram of a typical publish/subscribe system in the prior art. A subscriber 102, generates a subscription 104 with a broker 108 for a particular topic 106. The broker 108 includes a document sender 110 that sends a copy of a published document 112 for the subscribed topic 106 to the subscriber 102. A typical pseudo-code design for the subscriber 102 can be:

```
Subscribe to topic 106
Loop
{
    Wait for document 112 published to topic 106
    Process published document 112
}
```

Thus once the subscriber 102 has a subscription with the broker 108 for the topic 106, a copy of all documents published for the topic 106 are sent to the subscriber 102. Using this model the subscriber 102 only receives published documents when they are published, and all published documents are send to the subscriber. Where there is a long time interval between publication of documents the subscriber 102 will not receive any new published documents for the entire time interval. In some subscriber applications, such as a news headline ticker application, it is desirable to have regular updates of the latest published document regardless of whether new documents have been published. Conversely, where a large number of documents are published in a short space of time the subscriber will receive all published documents. For example, in a broker of stock price information can publish a large number of updated stock price documents every second. Such a large number of published documents burdens the subscriber 102 with excessive information. It is known in the art for the subscriber 102 to create the subscription 104 but for the subscriber 102 to not receive published documents. However, this results in an all-or-nothing approach where the subscriber 102 either receives all published documents, or none of the published documents.

BRIEF SUMMARY OF THE INVENTION

According to a first aspect of the present invention, a method for publishing documents in a publish/subscribe data processing system comprises receiving a first document to be published, the first document having an associated topic, retaining the first document to be published as a retained document, retaining a second document to be published as the retained document and sending a copy of the second document to be published to a subscriber of the associated topic in response to receiving the second document to be published before a predetermined time interval has passed, the second document having the associated topic, and sending a copy of the retained document to the subscriber of the associated topic in response to a determination that the predetermined time interval has passed.

According to another aspect of the present invention, an apparatus for publishing documents in a publish subscribe data processing system comprises a module for receiving a first document to be published, the first document having an associated topic, a module for retaining the first document to be published as a retained document, a module for retaining a second document to be published as the retained document and sending a copy of the second document to be published to a subscriber of the associated topic in response to receiving the second document to be published before a predetermined time interval has passed, the second document having the associated topic, and a module for sending a copy of the retained document to the subscriber of the associated topic in response to a determination that the predetermined time interval has passed.

According to yet another aspect of the present invention, a computer program product for publishing documents in a publish subscribe data processing system comprises a computer usable medium having computer useable program code embodied therein. The computer useable program code comprises computer usable program code configured to receive a first document to be published, the first document having an associated topic, computer usable program code configured to retain the first document to be published as a retained document, computer usable program code configured to retain a second document to be published as the retained document and sending a copy of the second document to be published to a subscriber of the associated topic in response to receiving the second document to be published before a predetermined time interval has passed, the second document having the associated topic, and computer usable program code configured to send a copy of the retained document to the subscriber of the associated topic in response to a determination that the predetermined time interval has passed.

Other aspects and features of the present invention will become apparent to those ordinarily skilled in the art or science to which it pertains upon review of the following description in conjunction with the accompanying figures.

DETAILED DESCRIPTION OF THE INVENTION

Figure 1:
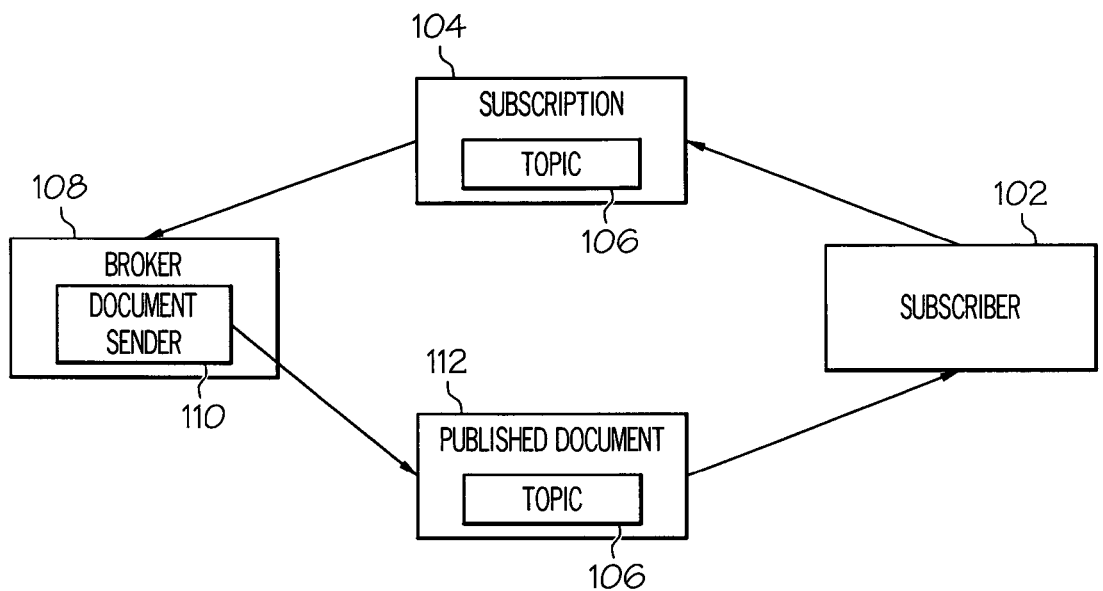
FIG. 1 is a block diagram of a typical publish/subscribe system in the prior art.

As will be appreciated by one of skill in the art, the present invention may be embodied as a method, system, or computer program product. Accordingly, the present invention may take the form of an entirely hardware embodiment or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as JAVA7, SMALLTALK or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
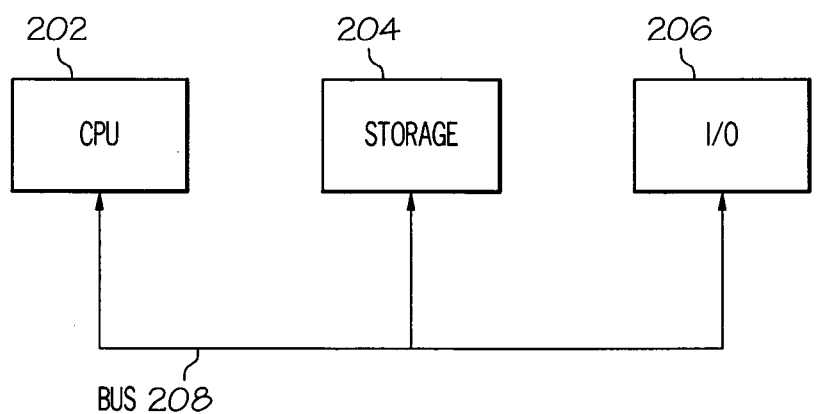
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
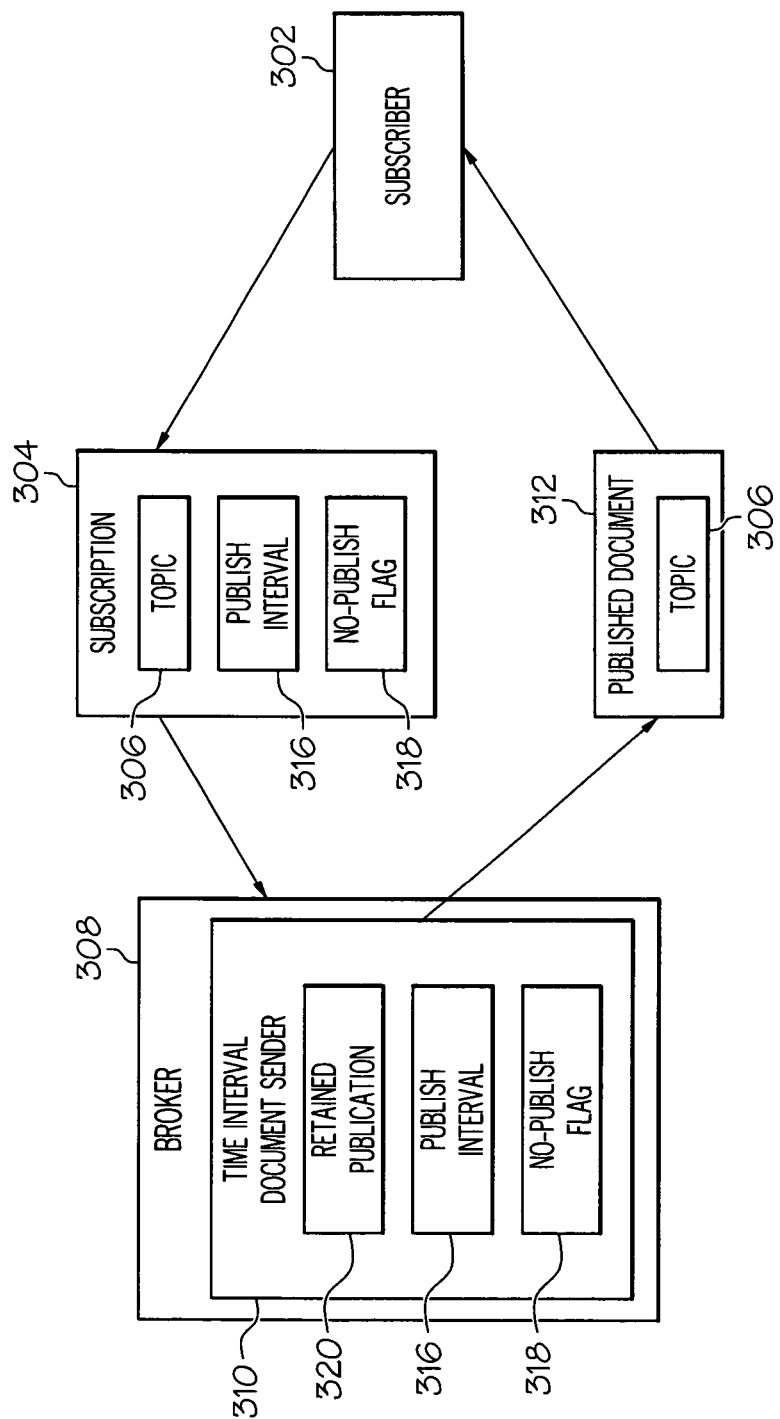
FIG. 3 is a block diagram of an illustrative publish/subscribe system according to one exemplary embodiment of the principles described herein.

FIG. 3 is a block diagram of a publish/subscribe system in accordance with an embodiment of the present invention. A subscriber 302, generates a subscription 304 with a broker 308 for a particular topic 306. The subscription includes a publish interval 316 and a no-publish flag 318 which are stored at the broker 308 and are described below with respect to the broker 308. The broker 308 includes a timed interval document sender 310 that includes a retained publication 320. The retained publication 320 is a copy of a document most recently published for the topic 306. The timed interval document sender 310 also stores the publish interval 316 and the no-publish flag 318 received in the subscription 304 from the subscriber 302.

The publish interval 316 is a time interval for the subscriber 302 after which a copy of the retained publication 320 will be sent to the subscriber 302 as a published document 312. The retained publication 320 is sent to the subscriber 302 even if it has previously been sent. Thus the time interval document sender 310 will send the retained publication 320 to the subscriber 302 regularly at intervals defined by the publish interval 316. The no-publish flag 318 is an indicator which determines whether documents published to the topic 306 should also be sent to the subscriber 302 as published document 312. For example, if the no-publish flag 318 is set to TRUE then new documents published to topic 306 are not sent to the subscriber 302. In contrast, if the no-publish flag 318 is set to FALSE, then such documents are sent to the subscriber 302. In any event, a new document published to the topic 306 will result in a change to the retained publication 320 that always stores a copy of the latest published document. Further, regardless of whether the no-publish flag 318 is set, the retained publication 320 is always sent to the subscriber 302 as published document 312 on expiry of the publish interval 316. In this way, a copy of a latest published document for the topic 306 (the retained publication 320) is sent to the subscriber 302 at regular intervals defined by the publish interval 316. In this way, the subscriber will receive a copy of the retained publication 320 in the absence of further published documents. Further, a copy of all new documents published to the topic 306 will be sent to the subscriber 302 dependent upon a value of the no-publish flag 318. Thus the subscriber can receive retained publication 320 at regular intervals without necessarily receiving all intermediate published documents.

Optionally, when a new document is published to topic 306 and the no-publish flag 318 is set to FALSE so that the new document is sent to the subscriber 302, the time interval document sender 310 can recommence waiting for the publish interval, i.e., when a new document is published to topic 306 the time interval is optionally reset.

Figure 4:
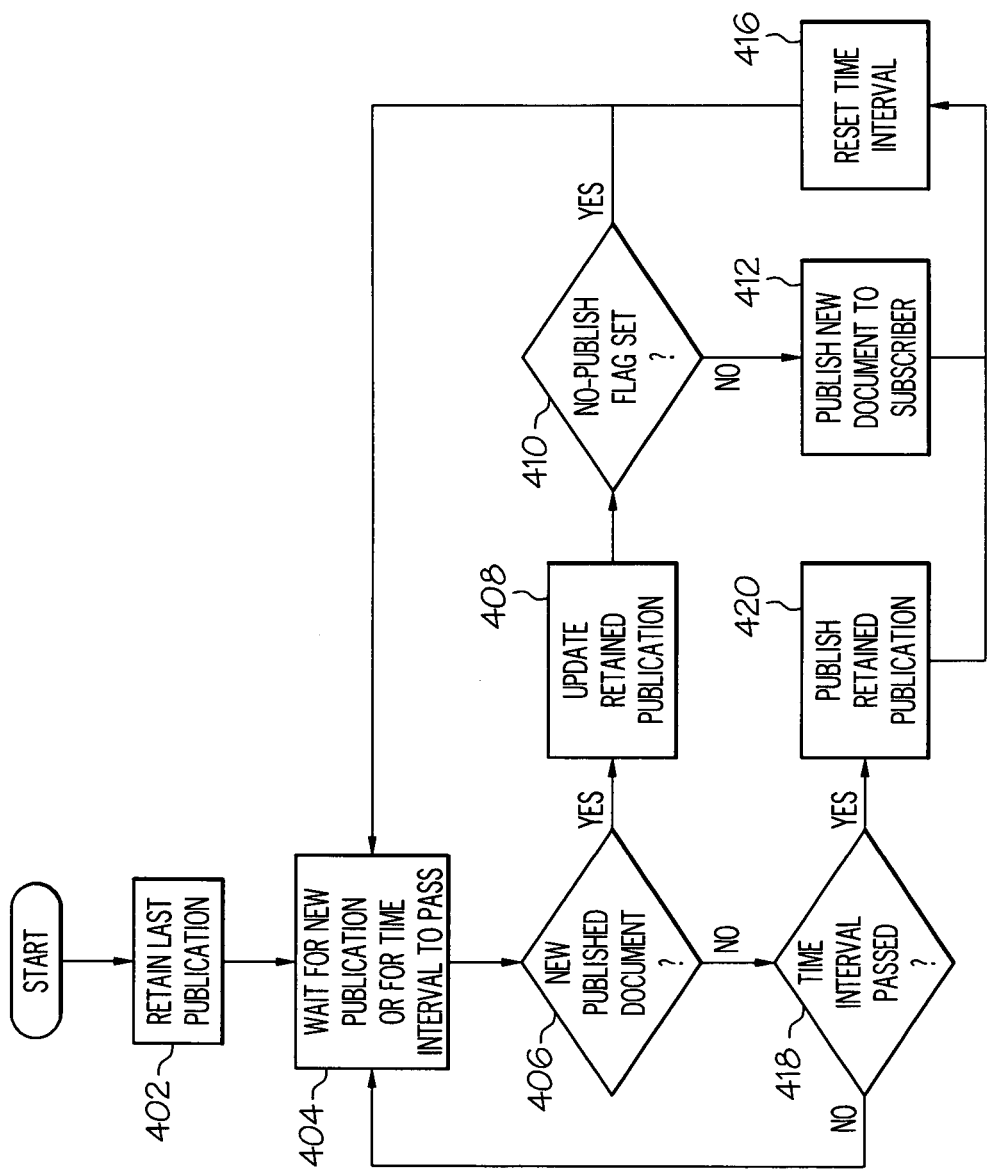
FIG. 4 is a flowchart illustrating a method for sending a published document for a topic to a subscriber in an embodiment of the present invention.

FIG. 4 is a flowchart illustrating a method for sending a published document 312 for a topic 306 to a subscriber 302 in an embodiment of the present invention. At step 402 a latest document published for the topic 306 is stored as retained publication 320. It is assumed that a latest published document exists, and if such a document does not exist then it is feasible to have an empty retained publication 320 until a document is published for the topic 306. At step 404 the method waits for a new document to be published to the topic 306, or alternatively for the publish interval 316 to pass. Determining when the publish interval 316 has passed can be easily achieved using a record of a start time and regularly calculating the increasing offset from the start time until the desired publish interval 316 has been reached, as is well known in the art. At step 406 the method determines if a new document has been published to the topic 306, and if so, proceeds to step 408 where the retained publication 320 is updated to reflect the new document. At step 410 the method checks if the no-publish flag 318 is set for the subscriber 302, and if so, the method returns to step 404. If, at step 410, the no-publish flag 318 is not set then the a copy of the new document is sent to the subscriber 302 as published document 312. Subsequently, and optionally, at step 416 the method commences waiting for the publish interval 316 all over again returning to step 404.

Returning to step 406, if the method determines that a new document has not been published to the topic 306, then the method proceeds to step 418. At step 418 the method determines if the publish interval 316 has passed, and if so, the method sends a copy of the retained publication 320 to the subscriber 302 as published document 312. Subsequently, and optionally, at step 416 the method commences waiting for the publish interval 316 all over again returning to step 404. If, alternatively, the publish interval 316 has not passed at step 418, the method returns to step 404.

Figure 5:
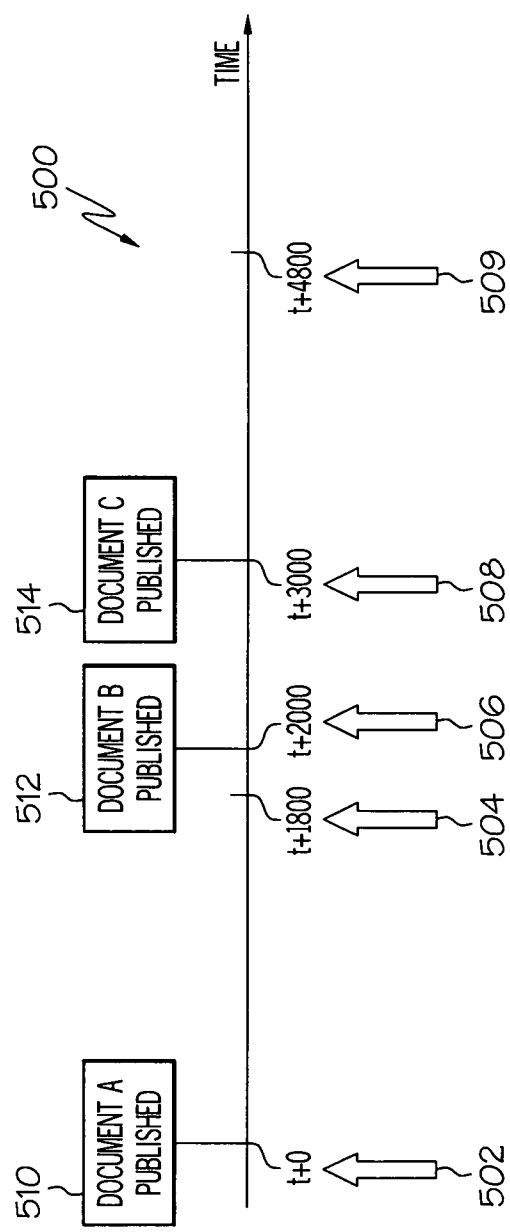
FIG. 5 illustrates a timeline corresponding to the publication of new documents to the topic of FIG. 3 for a first example subscription in accordance with an embodiment of the present invention.
Figure 6:
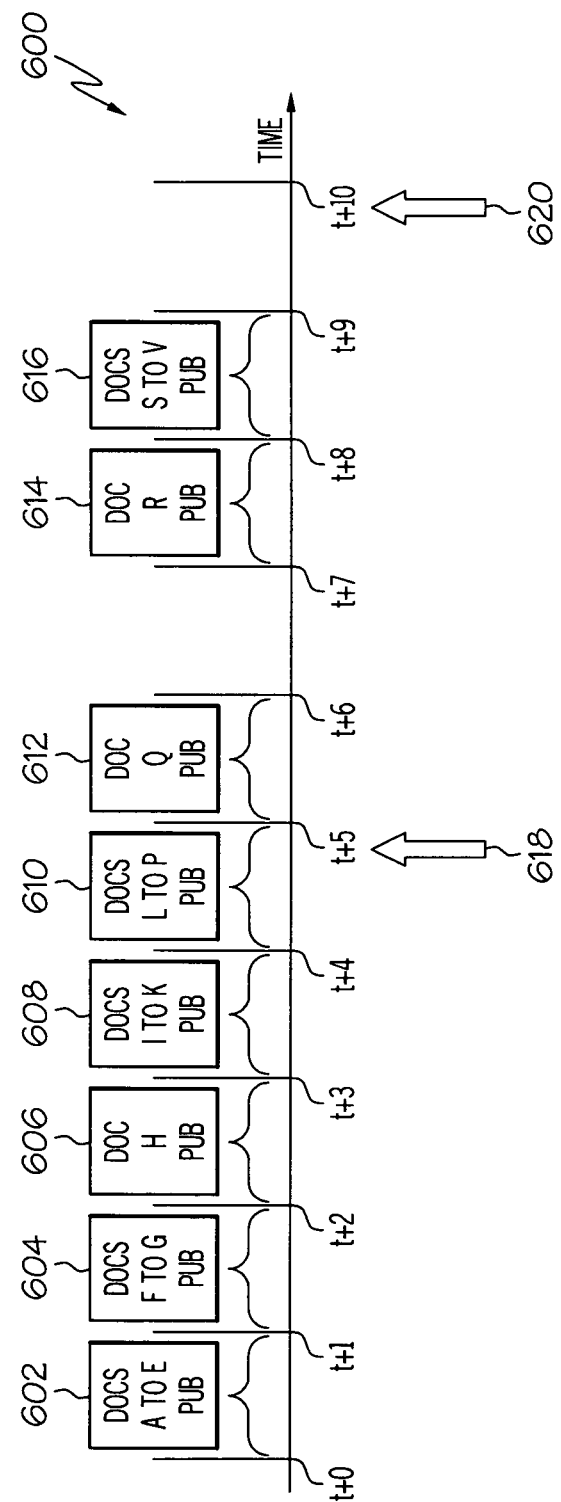
FIG. 6 illustrates a timeline corresponding to the publication of new documents to the topic of FIG. 3 for a second example subscription in accordance with an embodiment of the present invention.

The method of FIG. 4 will now be considered in use for two exemplary subscriptions with reference to FIG. 5 and FIG. 6. FIG. 5 illustrates a timeline 500 corresponding to the publication of new documents to the topic 306 of FIG. 3 for a first example subscription 304 in accordance with an embodiment of the present invention. The first example subscription 304 has a publish interval 316 of 1800 s (seconds) and a no-publish flag 312 set to FALSE. Where a particular point in time is indicated on the timeline 500 of FIG. 5 the time is relative to an arbitrary time 't'. FIG. 5 includes three documents published to the topic 306. These are: document 'A' 510 published at time t+0 s; document 'B' 512 published at time t+2000 s; and document 'C' 514 published at time t+3000 s. It is important to note that these documents are published to the topic 306 at these times, and that FIG. 5 is not intended to illustrate that copies of these documents are sent to the subscriber 302 at these times. Rather, the method of FIG. 4 will be used to determine which documents are sent to the subscriber 302 and when these are sent.

Considering the method of FIG. 4 for timeline 500 and the first example subscription 304, at step 402 and there has been no latest publication and the retained publication 320 is therefore an empty document. At step 404 the method waits for a new document to be published to the topic 306, or alternatively for the publish interval 316 to pass. Referring to the timeline 500, at time t+0 s the document 'A' 510 is published and the method determines that this is a new published document at step 406. Consequently, at step 408 the retained publication 320 is amended to correspond to the newly published document, document 'A' 510. At step 410 the method determines that the no-publish flag is not set (it is FALSE) and so the method sends a copy of the newly published document, document 'A' 510, to the subscriber 302 as published document 312. This publication to the subscriber 302 is indicated as bold arrow 502 on timeline 500. The method subsequently proceeds to step 416 where the method commences waiting for the publish interval 316 all over again returning to step 404. Thus, the publish interval 316 next expires at 1800 s after t+0 s which is at t+1800 s.

At step 404 the method waits for a new document to be published to the topic 306, or alternatively for the publish interval 316 to pass. The publish interval 316 of 1800 s passes to t+1800 s with no new documents published, and thus at t+1800 s the method proceeds to step 406. At step 406 the method determines that no new document has published, and at step 318 the method determines that the publish interval 316 has passed. At step 420 a copy of the retained publication 320 is sent to the subscriber 302 as published document 312. The current retained publication 320 is a copy of the document 'A' 510, thus a copy of document 'A' 510 is sent to the subscriber 302. This publication to the subscriber 302 is indicated as bold arrow 504 on timeline 500. The method subsequently proceeds to step 416 where the method commences waiting for the publish interval 316 all over again returning to step 404. Thus, the publish interval 316 next expires at 1800 s after t+1800 s which is at t+3600 s.

At step 404 the method waits for a new document to be published to the topic 306, or alternatively for the publish interval 316 to pass. Referring to the timeline 500, at time t+2000 s the document 'B' 512 is published and the method determines that this is a new published document at step 406. Consequently, at step 408 the retained publication 320 is amended to correspond to the newly published document, document 'B' 512. At step 410 the method determines that the no-publish flag is not set (it is FALSE) and so the method sends a copy of the newly published document, document 'B' 512, to the subscriber 302 as published document 312. This publication to the subscriber 302 is indicated as bold arrow 506 on timeline 500. The method subsequently proceeds to step 416 where the method commences waiting for the publish interval 316 all over again returning to step 404. Thus, the publish interval 316 next expires at 1800 s after t+2000 s which is at t+3800 s.

At step 404 the method waits for a new document to be published to the topic 306, or alternatively for the publish interval 316 to pass. Referring to the timeline 500, at time t+3000 s the document 'C' 514 is published and the method determines that this is a new published document at step 406. Consequently, at step 408 the retained publication 320 is amended to correspond to the newly published document, document 'C' 514. At step 410 the method determines that the no-publish flag is not set (it is FALSE) and so the method sends a copy of the newly published document, document 'C' 512, to the subscriber 302 as published document 312. This publication to the subscriber 302 is indicated as bold arrow 508 on timeline 500. The method subsequently proceeds to step 416 where the method commences waiting for the publish interval 316 all over again returning to step 404. Thus, the publish interval 316 next expires at 1800 s after t+3000 s which is at t+4800 s At step 404 the method waits for a new document to be published to the topic 306, or alternatively for the publish interval 316 to pass. The publish interval 316 of 1800 s passes to t+4800 s with no new documents published, and thus at t+4800 s the method proceeds to step 406. At step 406 the method determines that no new document has published, and at step 318 the method determines that the publish interval 316 has passed. At step 420 a copy of the retained publication 320 is sent to the subscriber 302 as published document 312. The current retained publication 320 is a copy of the document 'C' 514, thus a copy of document 'C' 514 is sent to the subscriber 302. This publication to the subscriber 302 is indicated as bold arrow 509 on timeline 500. The method subsequently proceeds to step 416 where the method commences waiting for the publish interval 316 all over again returning to step 404. Thus, the publish interval 316 next expires at 1800 s after t+4800 s which is at t+6600 s.

In summary the documents received by the subscriber 302 from the broker 308 for the first example subscription 304 above are:

| TIME | PUBLISHED DOCUMENT 312 |
| --- | --- |
| t + 0 s | Document 'A' 510 |
| t + 1800 s | Document 'A' 510 |
| t + 2000 s | Document 'B' 512 |
| t + 3000 s | Document 'C' 514 |
| t + 4800 s | Document 'C' 514 |

Thus a copy of the latest published document is sent to the subscriber 302 at regular 1800 s intervals despite no new documents being published for topic 306 (e.g. At t+1800 s and t+4800 s). Also, a copy of a newly published document is sent to the subscriber 302 as soon as it is published (e.g. At t+0 s, t+2000 s and t+3000 s).

FIG. 6 illustrates a timeline 600 corresponding to the publication of new documents to the topic 306 of FIG. 3 for a second example subscription 304 in accordance with an embodiment of the present invention. The second example subscription 304 has a publish interval 316 of 5 s and a no-publish flag 312 set to TRUE. FIG. 6 includes twenty two documents published to the topic 306. These are: documents 'A' to 'E' 602 (five documents) published between t+0 s and t+1 s; documents 'F' to 'G' 604 (two documents) published between t+1 s and t+2 s; document 'H' 606 (one document) published between t+2 s and t+3 s; documents 'I' to 'K' 608 (three documents) published between t+3 s and t+4 s; documents 'L' to 'P' 610 (five documents) published between t+4 s and t+5 s; document 'Q' 612 (one document) published between t+5 s and t+6 s; document 'R' 614 (one document) published between t+7 s and t+8 s; and documents 'S' to 'V' 616 (four documents) published between t+8 s and t+9 s. It is important to note that these documents are published to the topic 306 at these times, and that FIG. 6 is not intended to illustrate that copies of these documents are sent to the subscriber 302 at these times. Rather, the method of FIG. 4 will be used to determine which documents are sent to the subscriber 302 and when these are sent.

Considering the method of FIG. 4 for timeline 600 and the first example subscription 304, at step 402 and there has been no latest publication and the retained publication 320 is therefore an empty document. At step 404 the method waits for a new document to be published to the topic 306, or alternatively for the publish interval 316 to pass. Referring to the timeline 600, at time t+0 s no documents have published for topic 306 and the publish interval of 5 s has not passed. During the time interval between t+0 s and t+1 s the documents 'A' to 'E' 602 are published and the method determines that these are new published documents at step 406. Consequently, at step 408 the retained publication 320 is amended to correspond to the latest newly published document, document 'E'. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+1 s and t+2 s the documents 'F' to 'G' 604 are published and the method determines that these are new published documents at step 406. Consequently, at step 408 the retained publication 320 is amended to correspond to the latest newly published document, document 'G'. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+2 s and t+3 s the document 'H' 606 is published and the method determines that this is a new published document at step 406. Consequently, at step 408 the retained publication 320 is amended to correspond to the latest newly published document, document 'H' 606. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+3 s and t+4 s the documents 'I' to 'K' 608 are published and the method determines that these are new published documents at step 406. Consequently, at step 408 the retained publication 320 is amended to correspond to the latest newly published document, document 'K'. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+4 s and t+5 s the documents 'L' to 'P' 610 are published and the method determines that these are new published documents at step 406. Consequently, at step 408 the retained publication 320 is amended to correspond to the latest newly published document, document 'P'. At step 410 the method determines that the no-publish flag is set (it is TRUE) and so the method returns to step 404.

At step 404 the method waits for a new document to be published to the topic 306, or alternatively for the publish interval 316 to pass. At time t+5 s the publish interval 316 of 5 s has passed, and thus at t+5 s the method proceeds to step 406. At step 406 the method determines that no new document has published since the last published document was processed (Document 'P' processed above), and at step 318 the method determines that the publish interval 316 has passed. At step 420 a copy of the retained publication 320 is sent to the subscriber 302 as published document 312. The current retained publication 320 is a copy of the document 'P', thus a copy of document 'P' is sent to the subscriber 302. This publication to the subscriber 302 is indicated as bold arrow 618 on timeline 600. The method subsequently proceeds to step 416 where the method commences waiting for the publish interval 316 all over again returning to step 404. Thus, the publish interval 316 next expires at 5 s after t+5 s which is at t+10 s.

At step 404 the method waits for a new document to be published to the topic 306, or alternatively for the publish interval 316 to pass. Referring to the timeline 600, during the time interval between t+5 s and t+6 s the document 'Q' 612 is published and the method determines that this is a new published document at step 406. Consequently, at step 408 the retained publication 320 is amended to correspond to the latest newly published document, document 'Q' 612. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+7 s and t+8 s the document 'R' 614 is published and the method determines that this is a new published document at step 406. Consequently, at step 408 the retained publication 320 is amended to correspond to the latest newly published document, document 'R' 614. At step 410 the method determines that the no-publish flag is set (it is TRUE) and so the method returns to step 404.

At step 404 the method waits for a new document to be published to the topic 306, or alternatively for the publish interval 316 to pass. Referring to the timeline 600, during the time interval between t+8 s and t+9 s the documents 'S' to 'V' 616 are published and the method determines that these are new published documents at step 406. Consequently, at step 408 the retained publication 320 is amended to correspond to the latest newly published document, document 'V'. At step 410 the method determines that the no-publish flag is set (it is TRUE) and so the method returns to step 404.

At step 404 the method waits for a new document to be published to the topic 306, or alternatively for the publish interval 316 to pass. At time t+10 s the publish interval 316 of 5 s has passed, and thus at t+10 s the method proceeds to step 406. At step 406 the method determines that no new document has published since the last published document was processed (Document 'V' processed above), and at step 318 the method determines that the publish interval 316 has passed. At step 420 a copy of the retained publication 320 is sent to the subscriber 302 as published document 312. The current retained publication 320 is a copy of the document 'V', thus a copy of document 'V' is sent to the subscriber 302. This publication to the subscriber 302 is indicated as bold arrow 620 on timeline 600. The method subsequently proceeds to step 416 where the method commences waiting for the publish interval 316 all over again returning to step 404. Thus, the publish interval 316 next expires at 5 s after t+10 s which is at t+15 s.

In summary the documents received by the subscriber 302 from the broker 308 for the second example subscription 304 above are:

| TIME | PUBLISHED DOCUMENT 312 |
|---|---|
| t + 5 s | Document 'P' |
| t + 10 s | Document 'V' |

Thus, a copy of the latest published document is sent to the subscriber 302 at regular 5 s intervals despite the no-publish flag 318 being set for the subscriber. This is particularly useful where a large number of documents are published for topic 306 and the subscriber 302 only needs a subset of all the published documents by receiving a single, latest published, document on a regular basis.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for publishing documents in a publish/subscribe data processing system, the method comprising:
receiving a first document to be published, the first document comprising an associated topic;

retaining the first document to be published as a retained document;

retaining a second document to be published as the retained document;

sending a copy of the second document to be published to a subscriber of the associated topic in response to receiving the second document to be published before a predetermined set amount of elapsed time has passed, wherein the second document has the associated topic; and sending a copy of the retained document to the subscriber of the associated topic in response to a determination that the predetermined set amount of elapsed time has passed, in which sending a copy of the second document to be published to a subscriber of the associated topic in response to receiving the second document to be published before a predetermined set amount of elapsed time has passed, wherein the second document has the associated topic comprises:

accessing a value of a flag associated with the subscriber; and sending a copy of the second document to be published to a subscriber of the associated topic in response to a determination that the flag does not have a predetermined value.

2. The method of claim 1 wherein the predetermined set amount of elapsed time comprises a time offset from a start time.

3. The method of claim 2 wherein retaining a second document to be published as the retained document and sending a copy of the second document to be published to a subscriber of the associated topic in response to receiving the second document to be published before a predetermined set amount of elapsed time has passed comprises resetting the predetermined set amount of elapsed time by setting the start time to the current time.

4. An apparatus for publishing documents in a publish/subscribe data processing system, the apparatus comprising:

a processor communicatively coupled to a memory, said memory comprising executable code that, when executed by said processor, causes said processor to implement:

a first module for receiving a first document to be published, the first document comprising an associated topic;

a second module for retaining the first document to be published as a retained document;

a third module for retaining a second document to be published as the retained document; and a fourth module for sending a copy of the second document to be published to a subscriber of the associated topic at a intervals defined by a predetermined set amount of elapsed time irrespective of the value of a no-publish flag associated with the subscriber.

5. The apparatus of claim 4 wherein the predetermined set amount of elapsed time comprises a time offset from a start time.

6. The apparatus of claim 5 wherein the third module for retaining a second document to be published as the retained document comprises a module for resetting the predetermined set amount of elapsed time by setting the start time to the current time.

7. The apparatus of claim 4, in which the fourth module for sending a copy of the second document to be published to a subscriber of the associated topic at a intervals defined by a predetermined set amount of elapsed time irrespective of the value of a no-publish flag associated with the subscriber comprises:

a fifth module for accessing a value of a flag associated with the subscriber; and a sixth module for sending a copy of the second document to be published to the subscriber of the associated topic in response to a determination that the flag does not have a predetermined value irrespective of the predetermined set amount of elapsed time.

8. A computer program product for publishing documents in a publish/subscribe data processing system, the computer program product comprising:

a hardware computer readable storage medium comprising computer useable program code embodied therein, the computer useable program code comprising:

computer usable program code that, when executed by a processor, receives a first document to be published, the first document comprising an associated topic;

computer usable program code that, when executed by a processor, retains the first document to be published as a retained document;

computer usable program code that, when executed by a processor, retains a second document to be published as the retained document and sends a copy of the second document to be published to a subscriber of the associated topic in response to receiving the second document to be published before a predetermined set amount of elapsed time interval has passed, wherein the second document has the associated topic; and computer usable program code that, when executed by a processor, sends a copy of the retained document to the subscriber of the associated topic in response to a determination that the predetermined set amount of elapsed time has passed, in which the computer usable program code that, when executed by a processor, retains a second document to be published as the retained document and sends a copy of the second document to be published to a subscriber of the associated topic in response to receiving the second document to be published before a predetermined set amount of elapsed time has passed comprises:

computer usable program code that, when executed by a processor, accesses a value of a flag associated with the subscriber; and computer usable program code that, when executed by a processor, sends a copy of the second document to be published to a subscriber of the associated topic in response to a determination that the flag does not have a predetermined value.

9. The computer program product of claim 8 wherein the predetermined set amount of elapsed time comprises a time offset from a start time.

10. The computer program product of claim 9 wherein the computer usable program code that, when executed by a processor, retains a second document to be published as the retained document and sends a copy of the second document to be published to a subscriber of the associated topic in response to receiving the second document to be published before a predetermined set amount of elapsed time has passed comprises computer usable program code that, when executed by a processor, resets the predetermined set amount of elapsed time by setting the start time to the current time.

* * * * *